Sept. 7, 1926.

C. D. McARTHUR 1,598,779

GLASS FURNACE

Original Filed Nov. 1, 1919     2 Sheets-Sheet 1

INVENTOR.

Sept. 7, 1926. 1,598,779
C. D. McARTHUR
GLASS FURNACE
Original Filed Nov. 1, 1919 2 Sheets-Sheet 2

INVENTOR.

Patented Sept. 7, 1926.

1,598,779

UNITED STATES PATENT OFFICE.

CHARLES D. McARTHUR, OF PITTSBURGH, PENNSYLVANIA, ASSIGNOR TO BLAW-KNOX COMPANY, OF BLAWNOX, PENNSYLVANIA, A CORPORATION OF NEW JERSEY.

GLASS FURNACE.

Original application filed November 1, 1919, Serial No. 334,996. Divided and this application filed March 11, 1921. Serial No. 451,486.

Figure 1:
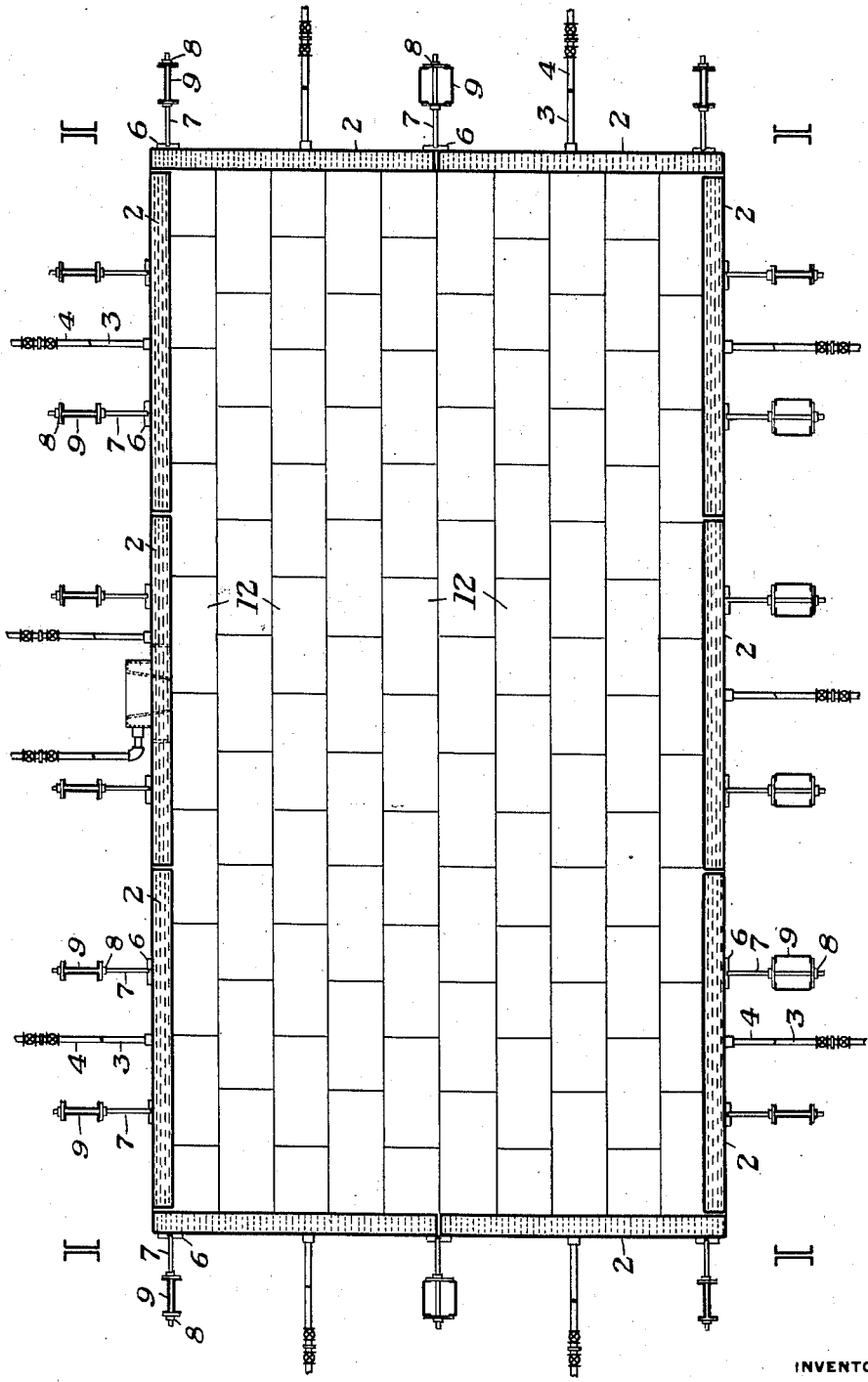
Figure 1 is a sectional plan view of one form of glass furnace.

My invention has relation to glass furnaces, and is designed to provide a glass furnace, or tank, in which the furnace or tank walls are composed of water cooled members which are adapted to resist the destructive action of the heating to which they are subjected, and which are constructed in separate units so arranged that any defective unit may be readily removed or replaced.

The present invention is a division of my application Serial No. 334,996, filed November 1, 1919.

In accordance with my invention, I construct the side and end walls of the furnace of a plurality of hollow metal sections or units 2, which more or less closely abut each other at their adjacent edges. Each section or unit is provided with suitable water circulating connections, as indicated at 3 and 4, by means of which water or other cooling fluid may be circulated therethrough. The inlet pipes 4 preferably extend into the lower portions of the sections, while the outlet pipes have arms 3ª extending upwardly into the highest point of the section. This arrangement prevents the formation of steam pockets, since the steam which collects in the pockets 3ᵇ may readily pass out through the pipes 3. The inner surfaces of these sections are directly exposed to and form the limiting wall for the glass in the tank. In practice, the glass which is in immediate contact with the sections becomes chilled and "freezes" in the joints so as to form effective sealing means therefor.

The water cooled sections or units are supported from the frame of the furnace by means which will permit of the ready removal of any section or unit without disturbing the adjacent sections or units. For this purpose, I preferably weld or otherwise secure to the outer surfaces thereof angle strips 6 extending transversely thereof, and which are engaged by stay rods 7. These stay rods are removably secured by nuts 8 in the buckstays 9 of the furnace, with their inner ends engaging the strips 6. This arrangement forms effective support for the units, while permitting any unit to be separately removed and replaced.

Figure 2:
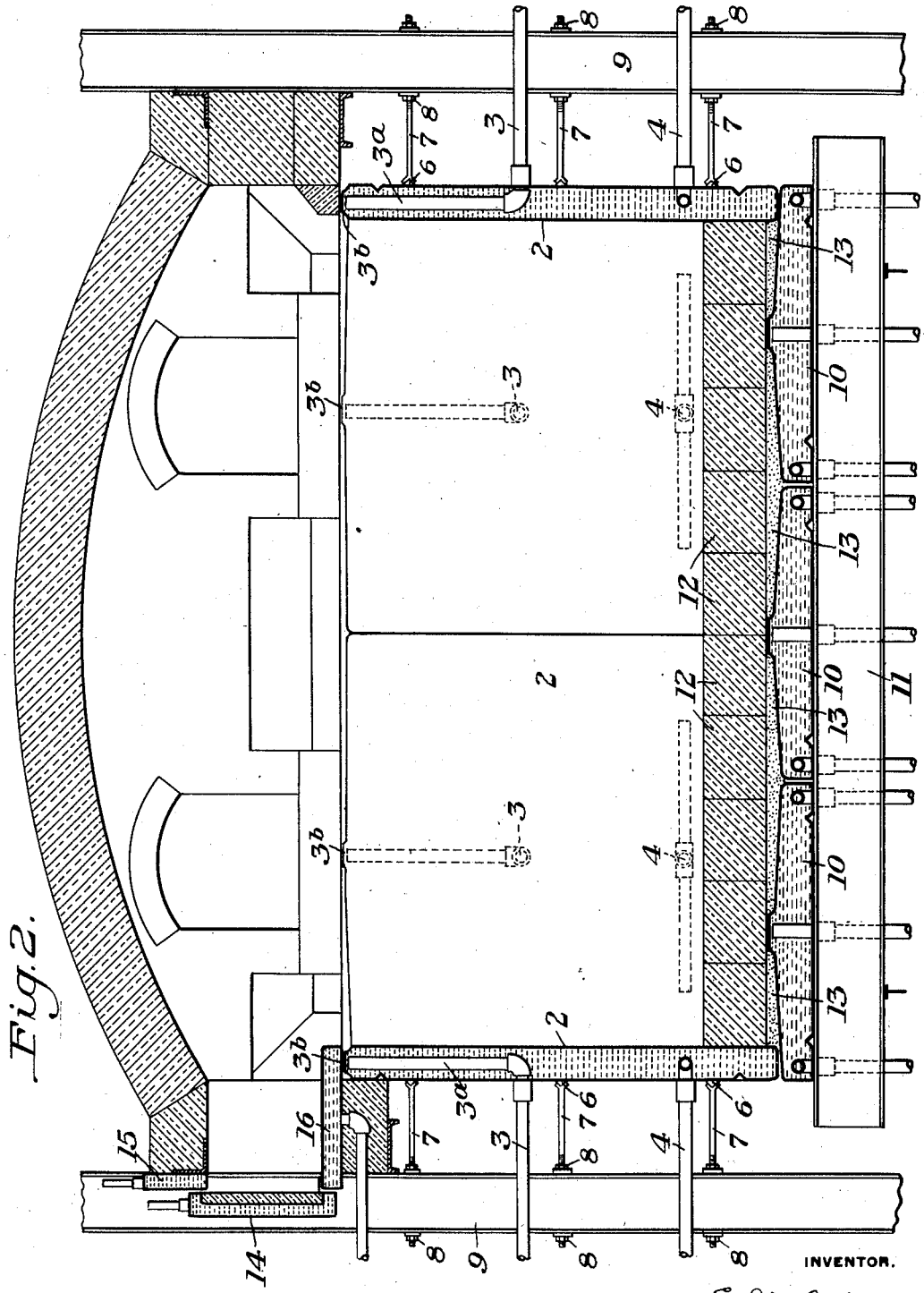
Figure 2 is a transverse section of the furnace shown in Figure 1.

The floor of the furnace may also be provided with similar sections or units 10 supported by the floor beams 11 and which form a support for the refractory bottom blocks 12. The sections or units 10 may have their upper surfaces sloping in opposite directions from the center lines, as shown in Figure 2, thus leaving intermediate spaces between the sections and the floor blocks which can be filled with any suitable refractory material, such as indicated at 13. This avoids direct contact of too great an area of the water cooled surfaces with the bottom blocks.

The doors and door frames of the furnace also are preferably provided with a suitable cooling means, such as indicated at 14 and 15. The sills of the door openings may also be provided with coolers such as shown at 16.

The advantages of my invention result from the fact that it provides means whereby the refractory blocks which usually form the walls of the furnace may be removed or dispensed with, and such walls be formed directly of sections or units which are so arranged that any section or unit can be readily removed or replaced.

I claim:

1. A glass tank furnace having a bottom formed of refractory blocks seated upon a series of hollow water-cooled members, said members being independent of each other and separately removable, substantially as described.

2. A glass tank furnace having a bottom formed of refractory blocks seated upon a series of hollow water-cooled members, said members being independent of each other and separately removable and having limited portions only thereof in direct contact with said blocks, substantially as described.

3. A glass tank furnace having a bottom formed of refractory blocks seated upon a series of hollow water cooled members, said members being separately removable and independent of each other and each having its upper surface inclined to provide limited portions only in supporting contact with said blocks, substantially as described.

4. A glass tank furnace having a vertical wall formed entirely by a plurality of hollow removable enclosed water cooled metallic sections placed side by side independently of each other, said sections having their inner surfaces directly exposed to and forming the limiting wall for the glass in the tank and having means for the offtake of vapor therefrom, substantially as described.

5. A glass tank furnace having a vertical wall formed by a plurality of independent and separately removable enclosed water cooled metal sections placed side by side, said sections having their inner surfaces directly exposed to and forming the limiting wall for the glass in the tank, buckstays exterior of said sections, means co-operating with the buckstays for supporting said sections to permit independent removal and replacement thereof, and water circulating connections for each section whereby any section may be cut off at will, substantially as described.

6. A glass furnace having a wall comprising a series of metallic sections having continuously extending encircling walls, said sections being independent of each other and placed side by side with their meeting edges free of each other, means supporting said sections for independent removal, and means co-operating with each section for establishing a circulation of cooling water therethrough, substantially as described.

7. A glass furnace having a wall comprising a series of metallic sections having continuously extending encircling walls, said sections being independent of each other and placed side by side with their meeting edges free of each other, means supporting said sections for independent removal, and means co-operating with each section for establishing a circulation of cooling water therethrough, each of said sections having a high point for the collection and offtake of vapors, substantially as described.

8. A furnace having a wall comprising a series of independent and separately removable hollow water cooled metal sections placed side by side and having their edges free of each other, each of said sections having continuously extending enclosing walls, means for circulating cooling fluid through each of said sections, and means entirely exterior of said sections for supporting the same for independent removal, substantially as described.

9. A furnace wall comprising a series of independent and separately removable enclosed hollow water cooled metal sections placed side by side, each section having independent water circulating connections comprising an inlet pipe extending into the lower portion of the section and an outlet pipe extending into the section below its upper end and extending upwardly therein to a point adjacent its top wall, said sections having high points for the collection and offtake of vapors, substantially as described.

10. A glass tank furnace having a bottom formed of refractory blocks seated upon a series of hollow water cooled members, said members being separately removable and having limited portions only thereof in direct contact with said blocks, said limited portions forming high points for the collection and offtake of vapors, an inlet connection for each of said members, and an offtake connection co-operating with each of said limited portions, substantially as described.

In testimony whereof I have hereunto set my hand.

CHARLES D. McARTHUR.